United States Patent [19]
Ponting et al.

[11] Patent Number: 5,974,385
[45] Date of Patent: Oct. 26, 1999

[54] SYSTEM AND METHOD FOR ORDERING DATA IN A COMPUTER SYSTEM IN ACCORDANCE WITH AN INPUT DATA SEQUENCE

[75] Inventors: Keith Michael Ponting; Robert William Series, both of Malvern, United Kingdom

[73] Assignee: The Secretary of State for Defense in Her Britannic Majesty's Government of the United Kingdom of Great Britain and Northern Ireland, Farnborough, United Kingdom

[21] Appl. No.: 08/849,034

[22] PCT Filed: Dec. 13, 1995

[86] PCT No.: PCT/GB95/02899

§ 371 Date: May 23, 1997

§ 102(e) Date: May 23, 1997

[87] PCT Pub. No.: WO96/19797

PCT Pub. Date: Jun. 27, 1996

[30] Foreign Application Priority Data

Dec. 19, 1994 [GB] United Kingdom .................. 9425539

[51] Int. Cl.⁶ .................................................. G06F 15/00
[52] U.S. Cl. ........................ 704/275; 395/821; 395/878; 395/893
[58] Field of Search .................................... 704/251–257, 704/200, 270, 275; 395/821, 878, 893

[56] References Cited

U.S. PATENT DOCUMENTS

| | | |
|---|---|---|
| 3,990,050 | 11/1976 | Kolettis et al. . |
| 4,158,750 | 6/1979 | Sako et al. .............................. 704/251 |
| 4,852,170 | 7/1989 | Bordeaux ................................ 704/254 |
| 4,866,778 | 9/1989 | Baker ...................................... 704/254 |
| 4,885,791 | 12/1989 | Fujii et al. .............................. 704/253 |
| 4,984,274 | 1/1991 | Yahagi et al. .......................... 704/251 |
| 5,231,691 | 7/1993 | Yasuda ................................... 704/200 |
| 5,590,355 | 12/1996 | Scichiku et al. .................... 395/800.26 |

FOREIGN PATENT DOCUMENTS

| | | |
|---|---|---|
| 607 615 A1 | 12/1993 | European Pat. Off. . |
| 2258067 | 1/1993 | United Kingdom . |
| WO 90/01195 | 2/1990 | WIPO . |

OTHER PUBLICATIONS

BYTE, vol. 18, No. 11, Oct. 1993 pp. 98–100, 102, XP 000396638 Crane H. D. et al, "Pen and Voice Input To Today's Interfaces Opens The Door For More Natural Communication With Your Computer".

*Primary Examiner*—David R. Hudspeth
*Assistant Examiner*—M. David Sofocleous
*Attorney, Agent, or Firm*—Nixon & Vanderhye P.C.

[57] ABSTRACT

An information processing system (10) receives input data from a keyboard (26), a mouse (28) and spoken data input device (30) in an input data sequence. A microphone (32) converts received speech into electrical signals which are digitized by an analogue to digital converter (100). A digital signal processor (102) converts the digital signals into multi-dimensional vectors which are stored in a temporary input buffer (104). A recognition processor (106) performs a recognition program in order to match the multi-dimensional vectors to speech models. In order that the system (10) may output data in an output data sequence which corresponds to the input data sequence, each data input receives a time stamp. A timing controller (24) ensures that instructions received from either the keyboard or the mouse are output only when those instructions have a time stamp which is earlier than the time stamp of the data most recently processed by the recognition processor.

16 Claims, 3 Drawing Sheets

SYSTEM AND METHOD FOR ORDERING DATA IN A COMPUTER SYSTEM IN ACCORDANCE WITH AN INPUT DATA SEQUENCE

BACKGROUND OF THE INVENTION

1. Field of the Invention

The present invention relates to an information processing system and in particular an information processing system having a plurality of data input devices.

2. Discussion of the Prior Art

Computerised speech recognition may be achieved by matching a sound pattern of a spoken word with one or more sound patterns or models stored in a speech recognition unit. The principles of sound pattern matching are described in a paper written by J. S. Bridle et al. in The Radio and Electronic Engineer, Volume 53, No. 4. pp. 167–175, April 1983 and in Chapter 7 of a book entitled "Speech Synthesis and Recognition", written by J. N. Holmes and published by Van Nostrand Reinhold in 1988. ISBN 0-278-00013-4.

It is known to describe a spoken word by a series of feature vectors. Each sound, or phoneme, comprising the word may be divided into a number of time frames over which that sound occurred. In each time frame, the sound energy in each of a number of frequency bands may be measured. The information so obtained may be represented as a multi-dimensional vector, with each dimension being one of the frequency bands. This vector is the feature vector, each of which represents a time-slice of the spoken word.

A currently available speech recognition system for a standard computer system is the Marconi Speech Systems MR8 speech recogniser which is interfaced to a host computer via an RS232 serial port. Software is provided to take output from the recogniser and mimic keyboard input to other applications running on the computer. Speech recognition systems conventionally show a time delay between a word, or series of words, being spoken and a token corresponding to the recognised word being output by the recogniser. A computer system which receives data both from a speech recogniser and a keyboard may suffer from the disadvantage that when spoken input occurs before keyboard input, the time delay between the words being spoken and being recognised may result in the keyboard entries being received and acted upon by the computer before the tokens from the recogniser are received.

It is an object of the invention to provide an improved information processing system.

The present invention provides an information processing system comprising:
  (a) a plurality of data input means for receiving data in a data input sequence and for generating data elements in response thereto, at least one of the data input means being means for receiving acoustic data; and
  (b) processing means for receiving the data elements from the data input means and for outputting processed data in a data output sequence;
characterized in that
  (i) the system includes means for associating each data element with at least one respective sequence indicator; and
  (ii) the processing means includes means for determining the output sequence from each data element's at least one sequence indicator such that the data output sequence is in correspondence with the data input sequence irrespective of differing processing means delays for data elements generated by differing input means.

The invention provides the advantage that data from a plurality of sources is provided in order of original input, irrespective of unequal delays introduced during the subsequent data processing. This is particularly beneficial for an information processing system having speech and non-speech inputs.

The speech recognition system may determine feature vectors from spoken input and from these feature vectors determine tokens corresponding to recognised words or phrases. In a preferred embodiment, the system includes means for receiving spoken data input and for determining feature vectors from the spoken data input and the data processor provides means for determining recognised tokens dependent upon the spoken data input.

SUMMARY OF THE INVENTION

In an alternative aspect, the invention provides a method of processing data including the steps of:
  a) receiving data elements in a data input sequence from a plurality of input sources, at least one of which provides data elements of spoken origin;
  b) associating a sequence indicator with each respective received data element;
  c) generating tokens to represent data elements of spoken origin by matching each spoken origin data element to a model; and
  d) establishing a data output sequence for processed data elements sequence such that the data output sequence corresponds to the data input sequence irrespective of differential processing delays by comparing sequence indicators of data elements from the plurality of sources.

In a further aspect, the invention provides an information processing system including:
  (a) a plurality of data input means arranged to provide data elements in a data input sequence, and
  (b) processing means arranged to receive the data elements and to produce output of processed data elements in an output sequence in correspondence with the data input sequence,
characterized in that the processing means is arranged to process each data element in a variable processing time interval dependent upon the data input means providing that data element and the processing means provides means for associating a time indicator with each data element and for comparing time indicators of differing processed data elements to determine the output sequence.

In another aspect, the invention provides an information processing system comprising:
  (a) processing means (24,24) for generating control signals; and
  (b) a plurality of data input means (26,28,30) for receiving input data and for providing the processing means (24,25) with input data signals in response thereto;
characterized in that the processing means includes:
  (i) means for attaching to each input data signal a marker signal showing the relative time at which the input data represented by the input data signal was received; and
  (ii) means for ordering the control signals whereby the control signals are arranged in an order which corresponds with the order in which the data input signals resulting in the respective control signals were received by the system.

BRIEF DESCRIPTION OF THE FIGURES

Embodiments of the invention will now be described, by way of example only, with reference to the accompanying drawings in which.

DETAILED DESCRIPTION OF THE PREFERRED EMBODIMENTS

Figure 1:
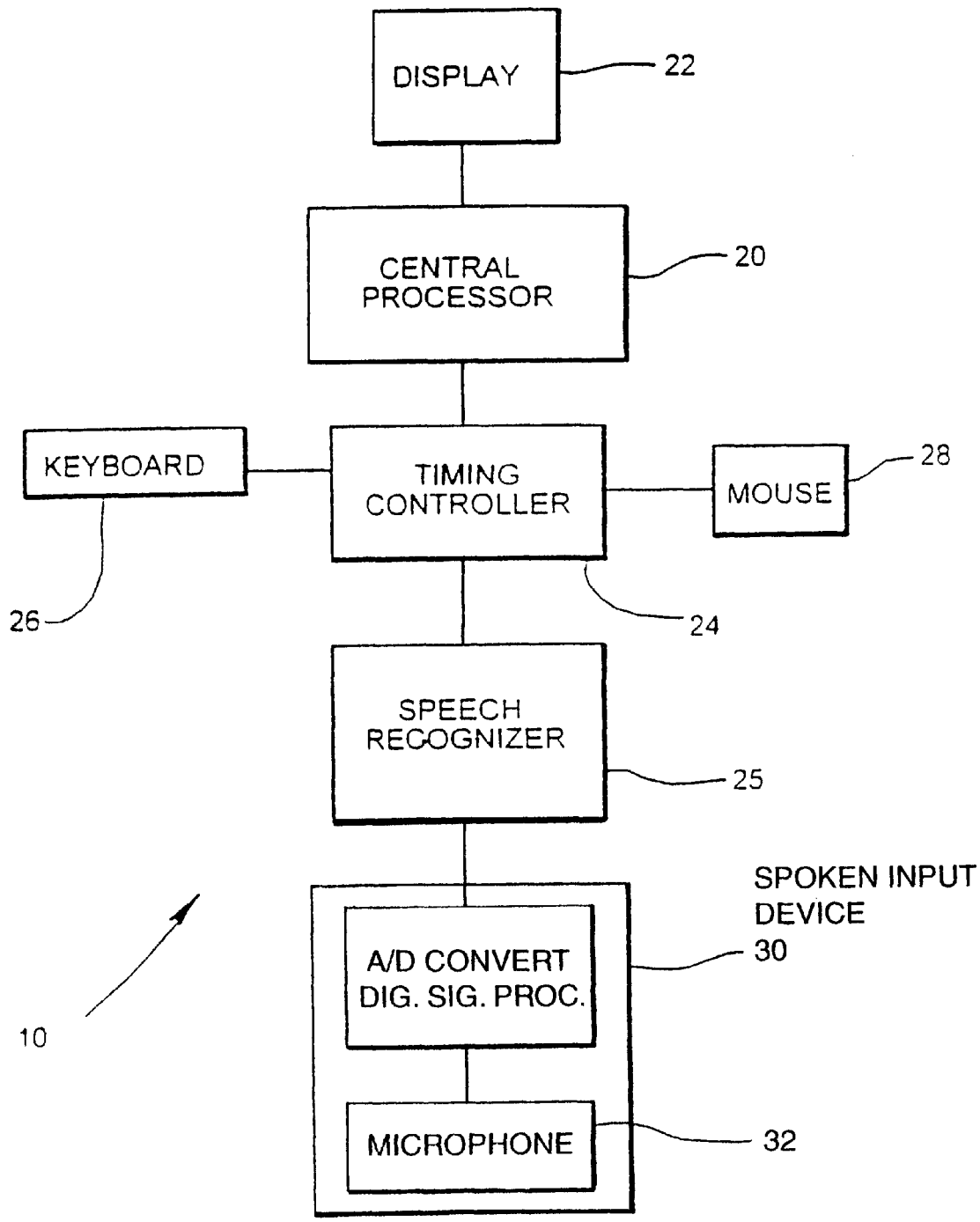
FIG. 1 schematically illustrates an information processing system of the invention.

Referring to FIG. 1 there is shown an information processing system 10 of the invention. The information processing system 10 is connected to a central processor 20 which is in turn connected to a display unit 22. The information processing system 10 comprises a timing controller 24 and a speech recognition unit 25 and a plurality of data input devices. These input devices are a keyboard 26, a mouse 28, and a spoken input device 30. The spoken input device 30 includes a microphone 32 which generates electrical signals in response to words being spoken by an operator of the system 10. These electrical signals are processed by the spoken input device and passed to the speech recognition unit 25.

The speech recognition unit 25 in turn outputs a token to the timing controller 24 representing the spoken data. An operator of the system 10 thus has three mechanisms for inputting instructions to the central processor 20. These three mechanisms are: (i) using spoken input, (ii) entering instructions using the keyboard 26, and (iii) entering instructions using the mouse 28 in conjunction with the display unit 22 for programs operating in the central processor 20 in a graphical user interface environment. The spoken input, the keyboard entered instructions and instructions entered using the mouse are referred to as data elements. The timing controller 24 ensures that data elements from the various input devices are passed to the central processor 20 in a correct data output sequence, this being the same sequence at which data input occurred to the system 10, this sequence being referred to as a data input sequence. Data of spoken origin includes words spoken by an operator of the system 10. Other forms of spoken input which might be input to the system 10 include recorded speech; broadcast speech and speech passed via a telecommunications systems; direct input of these forms of spoken input in electrical signal form to the system 10 may be provided.

Figure 2:
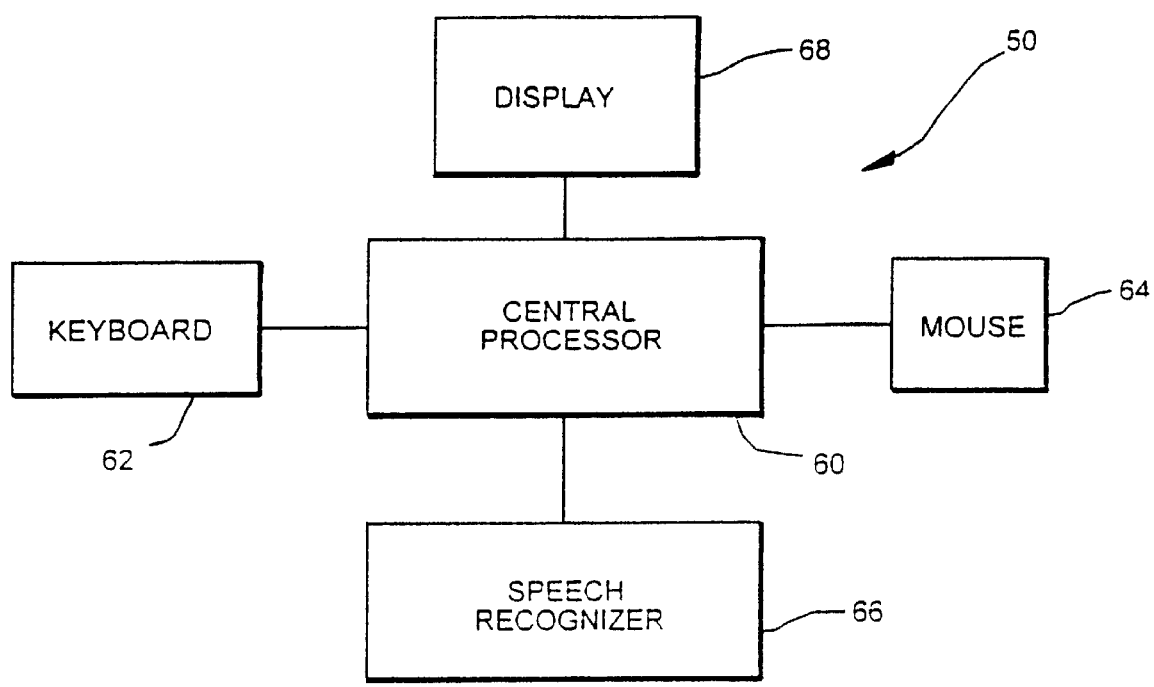
FIG. 2 schematically illustrates a prior art speech recognition system.

Referring now to FIG. 2 there is shown a prior art speech recognition system 50. In the prior art system 50, data is received by a central processor 60 directly from input devices such as a keyboard 62, a mouse 64, and a speech recogniser 66. Data is output by the central processor 60 to a display unit 68. The prior art system 50 suffers from the disadvantage that if spoken input is received by the speech recogniser 66 and this spoken input is followed by keyboard input, the central processor 60 may then receive instructions in reverse order. This could occur because there will be a finite delay between the speech recogniser 66 receiving spoken input and outputting a recognised token to the central processor 60. Instructions could be entered using the keyboard during this delay period and would be received by the processor before the token corresponding to the spoken input.

An example of the consequences of order reversal of input data is as follows. A user may wish to speak some commands and enter data using a keyboard. To achieve this the user speaks the command "File New" and then types some text. Although the user may speak the commands and start typing in correct sequence, the delay in the speech recogniser processing the spoken commands may result in the central processor 60 receiving the input from the keyboard before the command to open a new file has been received from the speech recogniser. In this case the text may be lost, or inserted in to the wrong document. To obtain a proper response, the user must wait until the speech recogniser has output the processed command before the data is entered using the keyboard. This is an inefficient use of time.

Figure 3:
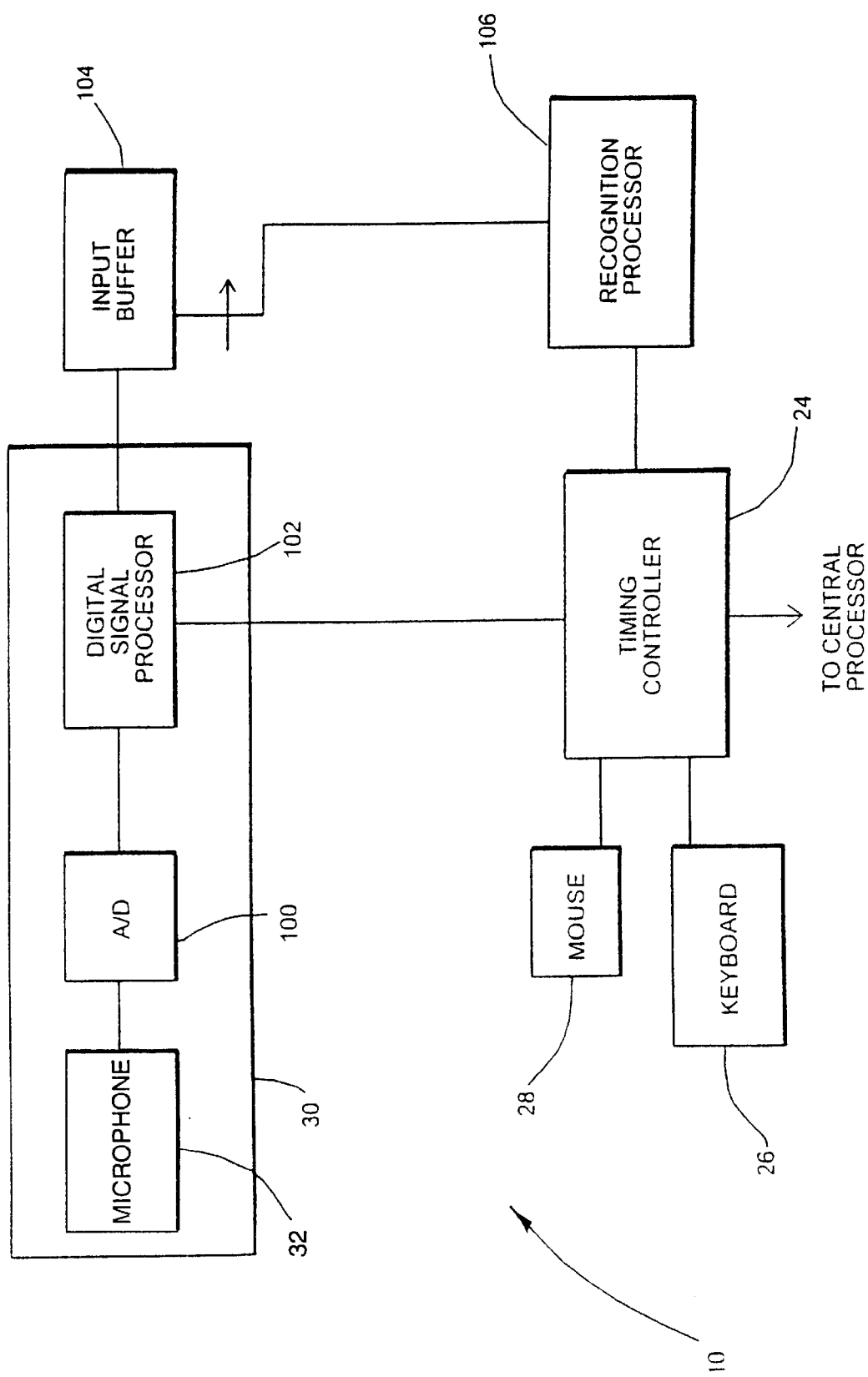
FIG. 3 schematically illustrates the FIG. 1 system in greater detail.

FIG. 3 shows a more detailed representation of the information processing system 10. The spoken input device 30 comprises the microphone 32 and an analogue to digital (A/D) converter 100. Electrical signals are passed from the microphone 32 to the A/D converter 100. The A/D converter 100 converts an analogue input signal into a digital output signal at a sample rate of 20 kHz. The digital output signal passes to a digital signal processor 102. The signal processor 102 is a processor available from AT&T having the product identification code DSP32C. The signal processor 102 is configured as a filter bank to compute the mean energy in each of twenty seven frequency bands, as shown in Table 1.

TABLE 1

| Band Number | Centre Frequency (Hz) | Band-width (Hz) | Band Number | Centre Frequency (Hz) | Band-width (Hz) |
| --- | --- | --- | --- | --- | --- |
| 0 | 0 | 120 | 14 | 1990 | 201 |
| 1 | 120 | 120 | 15 | 2198 | 215 |
| 2 | 240 | 120 | 16 | 2421 | 233 |
| 3 | 360 | 120 | 17 | 2670 | 267 |
| 4 | 481 | 121 | 18 | 2962 | 319 |
| 5 | 603 | 124 | 19 | 3315 | 390 |
| 6 | 729 | 127 | 20 | 3747 | 478 |
| 7 | 859 | 132 | 21 | 4277 | 584 |
| 8 | 994 | 138 | 22 | 4921 | 708 |
| 9 | 1136 | 146 | 23 | 5700 | 851 |
| 10 | 1286 | 154 | 24 | 6629 | 1011 |
| 11 | 1445 | 164 | 25 | 7728 | 1190 |
| 12 | 1615 | 175 | 26 | 9015 | 1387 |
| 13 | 1796 | 187 | | | |

The signal processor 102 outputs feature vectors at a rate of 100 Hz. Feature vectors are described by J. N. Holmes as referenced earlier, and are a representation frequency-energy distribution of the received sound in multi-dimensional space.

Here, the feature vector is a point in twenty-seven-dimensional space, the twenty-seven dimensions corresponding to the twenty-seven frequency bands into which the digital signal from the A/D converter 100 is processed. Each spoken word can be represented by either a single feature vector or a sequence of feature vectors.

In addition to extracting feature vectors from the digital signal, the signal processor 102 maintains a clock which generates sequential time frames. The signal processor adds to each feature vector a respective pair of time frame indicators, or time stamps, in the form of 32-bit words. A first time stamp identifies the time frame in which the respective feature vector starts and a second time stamp identifies the time frame in which the feature vector ends. The pair of time stamps identifies uniquely the time frames to which the feature vector associated with the pair relates. The time stamps serve to indicate the sequence in which data was input to the system. Each feature vector, together with its associated time stamps is passed to an input buffer 104. A recognition processor 106 receives data from the input buffer 104 when it is ready to receive data and performs a recognition program on the data. The recognition processor 106 is an Inmos™ T800 transputer with associated memory.

The recognition program is a connected speech recognition algorithm as described in the paper by Bridle et al. referenced earlier. Such a program is of well known kind, and has been implemented by many people skilled in the art of computerised speech recognition.

The recognition program analyses a sequence of feature vectors in terms of a number of models. Models may relate to words or strings of words to be recognised, models of any background noise, or any other anticipated input, such as "lip smacks" generated by a speaker opening of their lips. Each model is associated with a token. The token is a sequence of characters which uniquely identifies the model and is in effect a name for the model. The recognition program determines to which model each feature vector is associated, and as a result the start point and end point of each model are detected. This information about the start point and end point together with the recognized token is output by the recognition processor 106 to the timing controller 24.

By way of example, output from the recognition processor 106 in response to the spoken input "File New" may be as shown in Table 2.

TABLE 2

| Start Point | End Point | Token |
| --- | --- | --- |
| 1255 | 1256 | |
| 1257 | 1297 | File |
| 1298 | 1299 | |
| 1300 | 1301 | |
| 1302 | 1363 | New |

The token "." is associated with a model for background room noise. Table 2 indicates that from time frame 1255 to time frame 1256 the recogniser considered the operator not to be speaking. From time frame 1257 to time frame 1297, the operator was speaking and the spoken sound was considered to be best represented by a token corresponding to the word "file". There is then a period of four further time frames of non-spoken input, followed by 61 time frames in which the word "new" was spoken. Each of the rows in Table 2 corresponds to an event.

In addition to providing feature vectors with time stamps, the digital signal processor 102 makes a timing signal available to the timing controller 24. The timing controller 24 receives input from the recognition processor 106, the mouse 28 and the keyboard 26. Any keyboard entry or an operation of the mouse 28 is also an event, each of which is given a time stamp by the timing controller 24. The timing controller 24 maintains a register containing the end point time frame of the most recent event received from the recognition processor 106. The timing controller 24 maintains an event list in a memory of the events. Events are added to the list as they occur and are removed when they are no longer needed. It may be desirable to pass certain events originating from the mouse 28 through to the central processor 60 without being stored in the event list. Events corresponding to movement of the mouse rather may be passed directly to the central processor, provided that they have not been preceded by an event which has been stored in the timing controller.

The action of the timing controller 24 is as follows. The timing controller 24 has an initial state of monitoring the keyboard 26 and the mouse 28. When any changes occur to the status of one of these devices, such as a key being pressed, the timing controller 24 notes the event and the time frame when the event was received from the device and stores this information in the event list. The spoken input therefore receives a time stamp at the digital signal processor 102 and non-spoken input receives a time stamp at the timing controller 24. Data is provided to the system 10 in a data input sequence. The time stamps associated with each respective data input can be used to determine the order of that data in the data input sequence and so may be referred to as sequence indicators. The data input sequence which can be determined by the time stamps is thus the order in which the digital signal processor 102 receives spoken data and the timing controller 24 receives either keyboard entered or mouse entered data.

The timing controller 24 stores events received from the mouse 28 and the keyboard 26 in the order in which they are received, together with their respective associated time stamps in the event list. When the timing controller 24 receives an event from the recognition processor 106, it determines the time frame for the end point of the token. This time frame is referred to as the most recent time (MRT) sequence indicator. The MRT sequence indicator corresponds to the time stamp of the most recent speech input which the recognition processor 106 has finished processing. The timing controller 24 compares the MRT sequence indicator with the time stamps of all the keyboard and mouse entered events held in the event list, starting with the eldest. If these events are older than the MRT sequence indicator then the event is transmitted to the central processor 20 and is removed from the event list. When the timing controller 24 has considered every event stored in the event list it examines the token from the recognition processor 106. If the token corresponds to a period of silence, or some other model which is of no relevance to the central processor 20, the token is discarded. If the token from the recognition processor 106 corresponds to a command or other input of relevance, the token is transmitted to the central processor 20. The timing controller 24 then returns to the initial state.

Using the example illustrated earlier, the timing controller 24 may receive the keyboard entered text before the tokens corresponding to the spoken command "File New" have been received from the recognition processor 106. The keyboard data receives a time stamp for each key entry, and these events are stored in the event list. Since the time stamps for the keyboard events are later than the time stamp in the register at that time, they are not passed directly to the central processor 20. The timing controller 24 then receives the tokens "File" and "New". Only after the last of these has been passed to the central processor 20 does the timing controller 24 pass the keyboard entered data, stored in the memory, to the central processor 20. The timing controller passes data to the central processor in a data output sequence. The data output sequence corresponds directly to the data input sequence even though the timing controller may for example have received data comprising spoken input and keyboard input in a sequence which did not correspond to the data input sequence.

The timing controller 24 may be a separate processor to the recognition processor 106, operating its own separate program. Preferably, the operation of the timing controller 24 is included within the program controlling the operation of the recognition processor 106. Thus instead of being separate physical entities the recognition processor 106 and the timing controller 24 may be incorporated within the operating program of the transputer.

Whilst information processing systems incorporating a speech recognizer have been described, the principles involved may be extended to information processing systems which do not incorporate acoustic input devices. Systems which require differing processing times for data from differing input devices, such as systems incorporating handwriting recognizers, and which present the possibility of receiving data elements from one device whilst data elements from another device are being processed, may include means for time-stamping data elements as they are input to the system and means for determining a correct output sequence by comparison of the time stamps of processed data elements so that problems due to differential processing times for the data elements from differing input devices are circumvented.

We claim:

1. An information processing system comprising:
   (a) a plurality of data input devices for receiving data in a data input sequence and for generating data elements in response thereto, at least one of the data input devices being an acoustic data input device; and
   (b) a processor for receiving the data elements from the data input devices and for outputting processed data in a data output sequence;
   wherein
   (i) the processor is arranged to provide each data element with at least one respective time sequence indicator indicating the data element's position in the data input sequence; and
   (ii) the processor arranged to determine and reorder the output sequence in accordance with each data element's at least one sequence indicator such that the data output sequence is in correspondence with the data input sequence irrespective of differing delays for data elements generated by differing data input devices.

2. A system according to claim 1, wherein the processor is arranged to receive acoustic data elements from the acoustic data input device and to generate tokens representing the acoustic data elements.

3. A system according to claim 2, wherein the acoustic data elements are feature vectors generated from spoken input by the acoustic data input device and the processor is arranged to compare the feature vectors with stored models to generate tokens representing the acoustic data elements.

4. A system according to claim 3, wherein the processor is arranged to associate each data element with two input sequence indicators comprising a start indicator and an end indicator indicating respectively a time for the start of the acoustic data input and a time for the end of the acoustic data input.

5. A system according to claim 4, wherein the processor incorporates a storage device for storing the data elements and their respective sequence indicators and is arranged to generate a most recent time (MRT) sequence indicator corresponding to the end indicator of the most recent feature vector processed and to receive the MRT sequence indicator and to compare the MRT sequence indicator with the sequence indicators of data elements stored in the storage device to determine the output sequence.

6. A system according to claim 5, wherein the processor incorporates a plurality of programmed processing devices for determining said output sequence and receiving acoustic data elements.

7. A system according to claim 3, wherein the processor is arranged to determine said output sequence and receive acoustic data elements in a single programmed processor.

8. A system according to claim 7, wherein the system is arranged to perform the steps of:
   a) providing the processor with non-acoustic data elements from at least one input device,
   b) labelling the non-acoustic data elements with a sequence indicator and storing the data together with its sequence indicator in an event list,
   c) providing the processor with feature vectors corresponding to spoken acoustic data elements,
   d) generating tokens representing the feature vectors,
   e) determining a most recent time (MRT) sequence indicator corresponding to the end indicator of the token corresponding to the most recent feature vector processed by the processor,
   f) comparing the MRT sequence indicator with the sequence indicators of the non-spoken data stored in the event list,
   g) determining whether or not the sequence indicators of stored data predate the MRT sequence indicator and if so passing them to a central processing device, and
   h) passing a token to the central processing device when no stored sequence indicator predates the MRT sequence indicator.

9. A method of processing data including the steps of:
   a) receiving data elements in a data input sequence from a plurality of input sources, at least one of which provides data elements derived from spoken origin;
   b) processing the received data elements by associating a sequence indicator with each respective received data element to indicate its position in the data input sequence and generating tokens to represent data elements of spoken origin by matching each spoken origin data element to a model; and
   c) establishing a data output sequence for processed data elements and where necessary reordering them on the basis of their associated sequence indicator such that the data output sequence corresponds to the data input sequence irrespective of differences in processing delays for data elements received from different input sources.

10. An information processing system including
    (a) a plurality of data input devices arranged to provide data elements in a data input sequence, and
    (b) a processor arranged to receive and process the data elements and to output processed data elements in an output sequence in correspondence with the data input sequence,
    said processor arranged to process data elements in processing time intervals which differ dependent upon the data input device; said processor arranged to associate a time indicator with each data element and use the time indicators of differing processed input data elements associated with respective processed data elements to determine the output sequence.

11. An information processing system comprising:
    (a) a plurality of data input means for receiving input data and for generating input data signals in response thereto,
    (b) a processor:
       (i) for attaching a marker signal to each input data signal showing the time of receipt by the data input means and the relative position in an input data sequence;
       (ii) for generating output signals corresponding to a respective input data signal; and
       (iii) arranging the output signals in sequence on the basis of the marker signals of the associated input data signals so that the output signals have a sequence which is equivalent to said input data sequence.

12. An information processing system comprising:
(a) a plurality of data input devices for reception of input data and for generation of input data signals in response thereto; and
(b) computer processing apparatus for
(i) generating respective processed signals from the input data signals, each processed signal representing a respective input data signal together with a respective marker signal indicating reception time of the input data to which that input data signal corresponds, said apparatus processing input data signals from one of the input devices at a slower rate than input data signals from other input devices; and
(ii) ordering the processed signals in a sequence which is the same as that in which the data input signals were generated.

13. An information processing system comprising:
(a) a plurality of data input means for receiving data in a data input sequence and for generating data elements in response thereto, at least one of the data input means providing means for receiving acoustic data; and
(b) processing means for receiving the data elements from the data input means and for outputting processed data in a data output sequence;
wherein
(i) the system includes means for associating each data element with at least one respective time sequence indicator associated with receipt of said data for each corresponding data element; and
(ii) the processing means includes means for determining the output sequence from each data element's at least one sequence indicator such that the data output sequence is in correspondence with the data input sequence irrespective of differing processing means delays for data elements generated by differing input means,
wherein the processing means includes recognizing means for receiving acoustic data elements from the acoustic data input means and for generating tokens representing the acoustic data in response thereto,
wherein the acoustic data elements are feature vectors generated from spoken input by the acoustic data input means and the recognizing means is arranged to compare the feature vectors with stored models to generate tokens representing the acoustic data elements,
wherein the means for associating each data element with at least one respective sequence indicator is arranged to associate each acoustic data element with two sequence indicators comprising a start indicator and an end indicator indicating respectively a time for the start of the acoustic data input and a time for the end of the acoustic data input.

14. A system according to claim 13, wherein the means for determining said data output sequence incorporates storage means for storing the data elements and their respective sequence indicators and wherein the recognizing means is arranged to generate a most recent time (MRT) sequence indicator corresponding to the end indicator of the most recent feature vector processed by the recognizing means and the means for determining said output sequence is arranged to receive the MRT sequence indicator and to compare the MRT sequence indicator with the sequence indicators of data elements stored in the storage means to determine the output sequence.

15. A system according to claim 14, wherein the means for determining said output sequence and the recognizing means are programmed processors.

16. An information processing system comprising:
(a) a plurality of data input means for receiving data in a data input sequence and for generating data elements in response thereto, at least one of the data input means providing means for receiving acoustic data; and
(b) processing means for receiving the data elements from the data input means and for outputting processed data in a data output sequence;
wherein
(i) the system includes means for associating each data element with at least one respective time sequence indicator associated with receipt of said data for each corresponding data element; and
(ii) the processing means includes means for determining the output sequence from each data element's at least one sequence indicator such that the data output sequence is in correspondence with the data input sequence irrespective of differing processing means delays for data elements generated by differing input means, wherein the processing means includes recognizing means for receiving acoustic data elements from the acoustic data input means and for generating tokens representing the acoustic data in response thereto,
wherein the acoustic data elements are feature vectors generated from spoken input by the acoustic data input means and the recognizing means is arranged to compare the feature vectors with stored models to generate tokens representing the acoustic data elements, wherein the means for determining said output sequence and the recognizing means are embodied in a single programmed processor, wherein the system is arranged to perform the steps of:
a) providing the processing means with non-acoustic data elements from at least one input device,
b) labelling the non-acoustic data elements with a sequence indicator and storing the data together with its sequence indicator in an event list,
c) providing the processing means with feature vectors corresponding to spoken acoustic data elements,
d) generating tokens representing the feature vectors,
e) determining a most recent time (MRT) sequence indicator corresponding to the end indicator of the token corresponding to the most recent feature vector processed by the recognizing means,
f) comparing the MRT sequence indicator with the sequence indicators of the non-spoken data stored in the event list,
g) determining whether or not the sequence indicators of stored data predate the MRT sequence indicator and if so passing them to a central processor, and
h) passing a token to the central processor when no stored sequence indicator predates the MRT sequence indicator.

* * * * *